United States Patent
Camenisch et al.

(10) Patent No.: US 8,661,240 B2
(45) Date of Patent: *Feb. 25, 2014

(54) JOINT ENCRYPTION OF DATA

(75) Inventors: Jan L. Camenisch, Rueschlikon (CH); Kristiyan Haralambiev, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/438,987

(22) Filed: Apr. 4, 2012

(65) Prior Publication Data

US 2012/0278609 A1    Nov. 1, 2012

(30) Foreign Application Priority Data

Apr. 29, 2011    (EP) .................................. 11164333

(51) Int. Cl.
  *H04L 29/06*    (2006.01)
  *H04K 1/00*    (2006.01)
(52) U.S. Cl.
  USPC ......................................... 713/150; 380/255
(58) Field of Classification Search
  USPC ................. 713/150, 168–170, 176–177, 180; 380/28, 30, 255
  See application file for complete search history.

(56) References Cited

U.S. PATENT DOCUMENTS

| | | | |
|---|---|---|---|
| 7,814,326 B2 | 10/2010 | Gentry | |
| 7,925,010 B2 | 4/2011 | Sannino et al. | |
| 7,929,691 B2 | 4/2011 | Harrison et al. | |
| 8,185,744 B2 | 5/2012 | Brown et al. | |
| 8,352,378 B2 | 1/2013 | Al-Herz et al. | |
| 8,464,060 B2 | 6/2013 | Yao et al. | |
| 2003/0081785 A1 | 5/2003 | Boneh et al. | |
| 2005/0005125 A1 | 1/2005 | Zhang et al. | |
| 2005/0018851 A1 | 1/2005 | Venkatesan et al. | |
| 2006/0104439 A1 | 5/2006 | Asano | |
| 2010/0142704 A1 | 6/2010 | Camenisch et al. | |
| 2010/0211779 A1 | 8/2010 | Sundaram | |

FOREIGN PATENT DOCUMENTS

| | | |
|---|---|---|
| GB | 2401013 A | 10/2004 |
| GB | 2407740 A | 5/2005 |

OTHER PUBLICATIONS

ID-Based Multi-Proxy Signature and Blind Multisignature from Bilinear Pairings Xiaofeng Chen, Fangguo Zhang, Kwangjo Kim KIISC conference 2003.*

(Continued)

*Primary Examiner* — Christopher Revak
*Assistant Examiner* — Vadim Savenkov
(74) *Attorney, Agent, or Firm* — Cantor Colburn LLP

(57) ABSTRACT

A method for joint generation of a ciphertext by devices of a data processing system includes providing, by a first device, a first message, representing secret data of the first device, generating an initial ciphertext comprising an initial blinded encrypted message, in which the first message is encrypted under a public key of a trusted entity, and an initial consistency component for validating the initial ciphertext using the bilinear map; and sending the initial ciphertext to a second device; wherein the second device provides a second message, representing secret data of the second device, generates an updated ciphertext comprising an updated blinded encrypted message and an updated consistency component for validating the updated ciphertext, and generating a final ciphertext comprising the final encrypted message and a final consistency component for validating the final ciphertext, wherein the final consistency component is generated using the updated consistency component and the bilinear map.

5 Claims, 3 Drawing Sheets

(56) References Cited

OTHER PUBLICATIONS

Masayuki Abe, et al., "Structure-Preserving Signatures and Commitments to Group Elements," International Association for Cryptologic Research, CRYPTO, LNCS 6223, pp. 209-239; 2010.

Jan Camenisch, et al.,"On the Portability of Generalized Schnorr Proofs," EUROCRYPT, LNCS 5479; International Association for Cryptologic Research, pp. 425-442; 2009.

Jan Camenisch, et al., "Rethinking Accountable Privacy Supporting Services," DIM'08, ACM; pp. 1-8; Oct. 2008.

Ronald Cramer and Victor Shoup, "A Practical Public Key Cryptosystem Provably Secure Against Adaptive Chosen Ciphertext Attack," CRYPTO'98, LNCS 1462, pp. 13-25; 1998.

Ronald Cramer and Victor Shoup, "Design and Analysis of Practical Public-Key Encryption Schemes Secure Against Adaptive Chosen Ciphertext Attack," Society for Industrial and Applied Mathmatics; vol. 33; No. 1; pp. 167-226; 2003.

Jens Groth and Amit Sahai , "Efficient Non-interactive Proof Systems for Bilinear Groups," EUROCRYPT, LNCS 4965; International Association for Cryptoloic Research; pp. 415-432; 2008.

Hovav Shacham, "A Cramer-Shoup Encryption Scheme from the Linear Assumption and from Progressively Weaker Linear Variants," pp. 1-23; 2007.

Georg Fuchsbauer, "Automorphic Signatures and Applications," PhD Thesis, Universite Paris 7, Oct. 2010, pp. 1-105.

Benoit Libert, "New Secure Applications of Bilinear Maps in Cryptography," Thesis, Universite Catholique de Louvain, 2006, pp. 1-268.

F. Zhang et al, "Efficient ID-Based Blind Signature and Proxy Signature from Bilinear Pairings," ACISP'03 Proceedings of the 8th Australasian conference on Information security and privacy, 2003, pp. 1-12.

Intellectual Property Office; Application No. GB1206962.1; Patents Act 1977; Search Report Under Section 17; IPO. UK; Mailed Aug. 17, 2012; pp. 1-4.

* cited by examiner

| | Sender (pk) | | Receiver (sk, pk) |
|---|---|---|---|
| (a) | construct message $m$ | | |
| (b) | encrypt $m$ to $E=\mathrm{pk}(m)$ | | |
| (c) | generate consistency component $V(E, \mathrm{map})$ | | |
| (d) | Send ciphertext | $C(E,V)$ → | |
| (e) | | | confirm $V$ validates $C$ |
| (f) | | | decrypt $E$ by $\mathrm{sk}(E)$ to $m$ |

JOINT ENCRYPTION OF DATA

PRIORITY

This application claims priority to European Patent Application No. 11164333.4, filed 29 Apr. 2011, and all the benefits accruing therefrom under 35 U.S.C. §119, the contents of which in its entirety are herein incorporated by reference.

BACKGROUND

This invention relates generally to joint encryption of data whereby two parties in a data processing system jointly generate a ciphertext. Methods are provided for joint ciphertext generation by devices of a data processing system, together with devices and computer programs for implementing such methods.

Public key encryption is an important cryptographic tool in substantially any security protocol which aims to protect data communicated in data processing systems. The encryption scheme relies on a pair of cryptographic keys, namely a secret key and a public key, which are associated with a particular party to communications in the system. A party's public key is available to all users of the scheme, whereas the secret key remains secret to that party. When used in a basic messaging process where a sender wishes to communicate with a recipient while keeping the message data secret from others, the sender can encrypt the secret data via a cryptographic encoding process using the recipient's public key. Security relies on the premise that the resulting ciphertext can only be decrypted to recover the original plaintext message, i.e. the secret data, using the corresponding secret key of the key-pair. Thus only the authorised recipient, in possession of this secret key, can decrypt the ciphertext to reveal the secret data.

Encryption schemes can also be used to encrypt data under the public key of a trusted entity, or "trusted third party" (TTP). A simple example of such an application is illustrated schematically in FIG. 1 of the accompanying drawings. In this scenario, a user, represented here by a user pc (personal computer) 1, requests access to an internet-based service provided by a verifier represented by verifier server 2. The verifier permits anonymous access to the service and sends the user a bill. The identity of user 1 is thus not disclosed to the verifier in this interaction, but the verifier must be able to hold the user to account in the event that his bill is not paid. To this end, before accessing the service, user 1 generates a ciphertext ct encrypting his secret identity data ID. The secret ID is encrypted under the public key $pk_{TTP}$ of a trusted entity represented in the figure by TTP server 3. Also encrypted in the ciphertext is certain "context" data associated with the transaction. The context data allows a particular transaction to be identified and may include data indicating date, time, verifier ID, etc. as required. The ciphertext ct is generated using a verifiable encryption process which allows a recipient of the ciphertext to verify that the ciphertext contains a valid user ID without learning the ID itself. The resulting ciphertext ct is sent to the verifier 2 who then permits the user access to the service. If the user does not subsequently pay his bill, the verifier can apply to TTP 3 to obtain the user's identity. To do this, verifier 2 sends the ciphertext ct to TTP 3, together with suitable proof of non-payment for the transaction associated with the context data in the ciphertext. If satisfied of the need to identify the user, the TTP 3 can decrypt the ciphertext ct using the secret TTP key $sk_{TTP}$ corresponding to the public key $pk_{TTP}$ used for encryption. The decrypted user ID is returned to the verifier who can then pursue the user for payment.

Encrypting data under the public key of a trusted entity in systems like that of FIG. 1 provides a mechanism for balancing privacy and security in the system. The data encrypted under the trusted entity's public key is typically only used to investigate and punish a party who abuses the protocol in question. In this way, privacy can be afforded to "well-behaved" users whilst offering security to a verifying party that a misbehaving user can be held accountable for abuse. A particular example of such a system is detailed in our copending US Patent Application Publication No. US 2010/0142704 A1 and "Rethinking Accountable Privacy Supporting Services", Camenisch et al., DIM'08, Fairfax, Va., USA, 31 Oct. 2008.

In practice, the level of security provided by an encryption scheme ultimately depends on the extent to which an attacker can deduce information from a ciphertext without knowledge of the secret key. The current de-facto standard security notion for encryption schemes is known as "security against chosen-ciphertext attack" (CCA). This is defined in terms of the probability with which a notional attacker, operating under specified constraints (which permit limited access to a decryption oracle for decryption of ciphertexts chosen by the attacker), can detect which of two messages (plaintexts) corresponds to a given ciphertext. CCA-security is now the standard requirement because schemes fulfilling weaker security notions, e.g. so-called "semantic security" (security against chosen-plaintext attack (CPA)) have been shown to be vulnerable to certain types of attack.

There are many efficient public-key encryption schemes, but most require use of some sort of hash function such as collision-resistant hash functions or cryptographic hash functions. In particular, CCA-secure encryption schemes are typically obtained from semantically secure encryption schemes by adding consistency checks that prevent an attacker from modifying an observed ciphertext without detection. The final ciphertext contains both the encrypted message, produced by encryption of the plaintext message, and a consistency check component which is generated from the encrypted message using a hash function. A recipient of the ciphertext can verify that the consistency component is correct for the encrypted message and hence that the encrypted message is valid (i.e. has been validly computed by the sender and so not modified by an attacker). While this provides the basis for CCA security, the use of hash or similar functions in these schemes prevents certain proofs being made about the resulting ciphertext. In particular, the use of such functions prevents one from efficiently proving certain relations between their input and output. Such proofs are, however, an important requirement in some advanced security protocols where high levels of privacy are required. Some protocols, for instance, require a user to prove knowledge of a ciphertext which is validly computed without revealing the ciphertext to the verifying party. Some protocols also require two parties jointly to generate an encryption of their respective messages without revealing those messages to each other. For example, two parties (such as the user and verifier in a scenario similar to FIG. 1) may wish jointly to generate an encryption of respective secret data under the public key of a TTP. This is a common requirement in privacy-protecting cryptographic protocols where the mechanism is used to balance privacy and security as discussed above. The need for CCA security poses a problem in such scenarios.

Examples of CCA-secure encryption schemes based on hash functions are described in: "A Practical Public Key Cryptosystem Provably Secure against Adaptive Chosen Ciphertext Attack", R. Cramer and V. Shoup, CRYPTO '98, pages 13-25, Springer-Verlag, 1998; and "Design and Analysis of Practical Public-Key Encryption Schemes Secure against Adaptive Chosen Ciphertext Attack", R. Cramer and V. Shoup, SIAM Journal on Computing, 33:167-226, 2001. A hash-free variant of the Cramer-Shoup encryption scheme is also described. In this hash-free scheme, the hashing is avoided by treating some part of the ciphertext (elements in a prime-order group) as a sequence of bits, chopping the sequence into blocks of bits, and treating the chopped values as numbers modulus the prime order which are then fed into a specific function evaluation. Essentially, this process builds a purpose-specific hash function which would allow proof of certain relations between the input and the output but require both the input and the output to be fully revealed. This of course defeats the object of proving relations between the input and the output because, if both are revealed, one could simply evaluate the appropriate function on the input and check the result against the given output. A linear Cramer-Shoup encryption scheme is also disclosed in "A Cramer-Shoup Encryption Scheme from the Linear Assumption and from Progressively Weaker Linear Variants, H. Shacham, 2007, Cryptology ePrint Archive, Report 2007/074. The security of this scheme is based on the Decisional Linear Assumption (DLIN) and relies crucially on the use of a hash function, again preventing proofs without revealing the ciphertext.

In the field of digital signatures, knowledge of a signature can be proved without revealing the signature to a verifier. Signature schemes permitting such proofs of knowledge can be implemented in a variety of ways. One example uses bilinear groups in implementing the signature scheme. This "structure-preserving" signature scheme is discussed in "Structure-Preserving Signatures and Commitments to Group Elements", Abe et al., CRYPTO 2010, LNCS 6223, pp. 209-236, 2010.

SUMMARY

In one embodiment, a method for joint generation of a ciphertext by devices of a data processing system includes providing, by a first device, a first message, representing secret data of the first device, comprising at least one element of a pair of base groups $G_1$, $G_2$ satisfying a bilinear map ê: $G_1 \times G_2 \rightarrow G_T$ where $G_T$ is a target group; generating an initial ciphertext comprising an initial blinded encrypted message, in which the first message is encrypted under a public key of a trusted entity, and an initial consistency component for validating the initial ciphertext, wherein the initial consistency component is generated using the bilinear map; and sending the initial ciphertext to a second device; wherein the second device receives the initial ciphertext, provides a second message, representing secret data of the second device, comprises at least one element of the pair of base groups, generates an updated ciphertext comprising an updated blinded encrypted message and an updated consistency component for validating the updated ciphertext, wherein the updated blinded encrypted message is generated using the initial blinded encrypted message and an encryption of the second message under the public key, and wherein the updated consistency component is generated using the initial consistency component and the bilinear map, and sends the updated ciphertext to the first device; and receiving, at the first device, the updated ciphertext; unblinding the updated blinded encrypted message to obtain a final encrypted message; and generating a final ciphertext comprising the final encrypted message and a final consistency component for validating the final ciphertext, wherein the final consistency component is generated using the updated consistency component and the bilinear map.

In another embodiment, a system includes a first device configured for joint generation of a ciphertext with a second device in a data processing system, the first device comprising memory for storing a first message, representing secret data of the first device, comprising at least one element of a pair of base groups $G_1$, $G_2$ satisfying a bilinear map ê: $G_1 \times G_2 \rightarrow G_T$ where $G_T$ is a target group, a communications interface for communicating with the second device, and control logic adapted to: generate an initial ciphertext comprising an initial blinded encrypted message, in which the first message is encrypted under a public key of a trusted entity, and an initial consistency component for validating the initial ciphertext, the initial consistency component being generated using the bilinear map; send the initial ciphertext via the communications interface to the second device; on receipt from the second device of an updated ciphertext comprising an updated blinded encrypted message and an updated consistency component for validating the updated ciphertext wherein the updated blinded encrypted message comprises the initial blinded encrypted message and an encryption under the public key of a second message, representing secret data of the second device and comprising at least one element of the pair of base groups, to unblind the updated blinded encrypted message to obtain a final encrypted message; and to generate a final ciphertext comprising the final encrypted message and a final consistency component for validating the final ciphertext, the final consistency component being generated using the updated consistency component and the bilinear map.

In general, where features are described herein with reference to an embodiment of one aspect of the invention, corresponding features may be provided in embodiments of another aspect of the invention as appropriate.

BRIEF DESCRIPTION OF THE SEVERAL VIEWS OF THE DRAWINGS

Referring to the exemplary drawings wherein like elements are numbered alike in the several Figures.

DETAILED DESCRIPTION

Figures 1, 2:
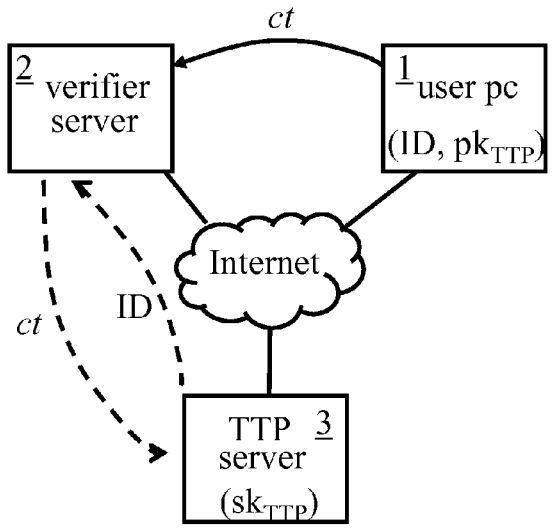
FIG. 1 illustrates implementation of a prior verifiable encryption scheme in an exemplary data processing system.
FIG. 2 illustrates key steps in an exemplary application of an encryption scheme underlying joint ciphertext generation methods embodying the invention.

The joint ciphertext generation techniques to be described are based on a CCA-secure encryption scheme which is detailed in our copending European patent application filed concurrently herewith under Applicant's reference CH9-2010-0084 (the content of which is incorporated herein by reference). This basic encryption scheme is described in the following in the context of a simple communication between a sender device (the "sender") and a receiving device (the "receiver"). In this process, the sender needs to send a message to the receiver while preserving privacy of the message data against unauthorized access, e.g. by a malicious party intercepting the message. The key steps in the process are indicated in FIG. 2, where steps performed by the sender are shown on the left of the figure and steps performed by the receiver are shown on the right. The messaging operation utilizes a cryptographic key pair (sk, pk). The key pk is a public key which is published by the receiver and so available to the sender. The key sk is a secret key known only to the receiver.

In a first step, step (a), of the messaging operation, the sender 2 constructs a message comprising the secret data to be communicated. In this step, the secret data is represented by a message m comprising one or more elements of a pair of algebraic groups as discussed further below. In step (b), the sender encrypts the message m using the receiver's public key pk, thereby producing an encrypted message E. The encryption process is described in more detail below. Next, in step (c), the sender generates a consistency component V for the encrypted message. As detailed below, the consistency component V is generated using the encrypted message E and a bilinear map which is associated with the algebraic groups from which the message m is constructed. A ciphertext C, which includes both the encrypted message E and its verification component V, forms the output of the encryption process. In step (d), the sender sends the ciphertext C to the receiver. The receiver then determines in step (e) of the process whether the ciphertext is valid. In particular, the receiver determines whether the consistency component V is correct for (i.e., consistent with) the encrypted message E in the ciphertext. Details of this process are given below. If the consistency component is correct then this confirms that the ciphertext is valid, i.e. it has been validly computed by the sender and has not been tampered with in transit to the receiver. Assuming the ciphertext is validated, then in step (f) the receiver proceeds to decrypt the encrypted message E using its secret key sk. The decryption process recovers the original message m constructed by the sender.

An exemplary implementation of the above encryption scheme, including details of the underlying cryptographic processes, is described in the following. For the purposes of this scheme, a message m contains at least one element of a pair of base groups $G_1$, $G_2$ satisfying a bilinear map $\hat{e}$: $G_1 \times G_2 \to G_T$ where $G_T$ is a target group. For simplicity in this example, $G_1$ and $G_2$ are taken to be identical groups denoted by G. In particular, G and $G_T$ represent groups of prime order q equipped with a non-degenerate, efficiently computable bilinear map $\hat{e}$: $G \times G \to G_T$.

The scheme to be described is secure under the Decisional Linear Assumption (DLIN). This assumption is well-known in the art and can be expressed as follows: let G be a group of prime order q; $g_1, g_2, g_3 \leftarrow G$; and $r, s, t \leftarrow Z_q$. The following two distributions are computationally indistinguishable: $(G, g_1, g_2, g_3, g_1^r, g_2^s, g_3^t)$ and $(G, g_1, g_2, g_3, g_1^r, g_2^s, g_3^{r+s})$.

For simplicity in this illustration, the scheme will be described as encrypting a message m that is a single group element in G. The scheme also supports labels. In particular, a message m is deemed to be associated with a label which corresponds to at least one element of the pair of base groups $G_1$, $G_2$ (here the same group G). The use of labels is well known in the encryption field and need not be discussed in detail here. It suffices to understand that a label permits additional information to be associated with a message. For example, labels might be used to attach context information to a transaction, permitting different transactions involving the same message m to be distinguished by use of a different label in each transaction. For simplicity in this example, a label L is assumed to be a single group element in the pair of base groups (and hence in the single group G here).

The key pair (sk, pk) used in the scheme is generated as follows:

KeyGen($1^\lambda$): Choose random group generators $g, g_1, g_2, g_3 \leftarrow G^*$. For randomly chosen $\vec{\alpha} \leftarrow Z_q^3$ set $h_1 = g_1^{\alpha_1} g_3^{\alpha_3}$, $h_2 = g_2^{\alpha_2} g_3^{\alpha_3}$. Then, select $\vec{\beta}_0, \ldots, \vec{\beta}_5 \leftarrow Z_q^3$, and compute $f_{i,1} = g_1^{\beta_{i,1}} g_3^{\beta_{i,3}}$, $f_{i,2} = g_2^{\beta_{i,2}} g_3^{\beta_{i,3}}$, for $i = 0, \ldots, 5$. Output the public key pk=$(G, g, g_1, g_2, g_3, h_1, h_2, \{f_{i,1}, f_{i,2}\}_{i=0}^5)$ and secret key sk=$(\vec{\alpha}, \{\vec{\beta}_i\}_{i=0}^5)$.

The encryption scheme as employed in steps (b) to (d) of FIG. 2 is defined by the following:

Encrypt$_{pk}^L$(m): Choose random and $r, s \leftarrow Z_q$.

A random component, consisting of three elements $u_1, u_2$ and $u_3$, is generated as: $u_1 = g_1^r$, $u_2 = g_2^s$, $u_3 = g_3^{r+s}$.

The encrypted message E is generated using the public key pk as: $E = m \cdot h_1^r h_2^s$.

The verification component V is generated as:

$$V = \prod_{i=0}^{3} \hat{e}(f_{i,1}^r f_{i,2}^s, u_i) \cdot \hat{e}(f_{4,1}^r f_{4,2}^s, c) \cdot \hat{e}(f_{5,1}^r f_{5,2}^s, L)$$

where $u_0 = g$.

The output ciphertext is then constructed as:

$\vec{C} = (u_1, u_2, u_3, E, V)$.

Both the encrypted message and the random component in this algorithm comprise a set of elements from the pair of base groups (here the same group G). In this particular example the encrypted message consists of a single group element and the random component consists of three group elements. The consistency component V is generated by applying the bilinear map to the encrypted message E, the random component elements $u_1$ to $u_3$, and the label L. Each application of the bilinear map yields an element of the target group $G_T$. A product of these elements is calculated in accordance with the formula given above to yield a consistency component which comprises a single element of $G_T$ in this example. The output ciphertext C here is a concatenation of the random component, the encrypted message E and the verification component V.

The decryption scheme as employed in steps (e) to (f) of FIG. 2 is defined by the following:

Decrypt$_{sk}^L(\vec{C})$: Parse $\vec{C}$ as $(u_1, u_2, u_3, E, V)$ and check whether:

$$V \stackrel{?}{=} \prod_{i=0}^{3} \hat{e}(u_1^{\beta_{i,1}} u_2^{\beta_{i,2}} u_3^{\beta_{i,3}}, u_i) \cdot \hat{e}(u_1^{\beta_{4,1}} u_2^{\beta_{4,2}} u_3^{\beta_{4,3}}, E) \cdot \hat{e}(u_1^{\beta_{5,1}} u_2^{\beta_{5,2}} u_3^{\beta_{5,3}}, L)$$

where $u_0 = g$.

If this is successful then the ciphertext is validated. If unsuccessful the ciphertext is rejected as invalid. Assuming validation, the ciphertext is decrypted using the secret key sk via:

$m = E \cdot (u_1^{\alpha_1} u_2^{\alpha_2} u_3^{\alpha_3})^{-1}$ revealing the original message m.

The foregoing defines an efficient construction for a CCA encryption scheme which is secure under DLIN. CCA security can be easily demonstrated via the usual game analysis which will be readily apparent to those skilled in the art and need not be reproduced here. Moreover, the above scheme possesses a major advantage over prior CCA encryption schemes. As described earlier, prior schemes employ techniques such as cryptographic hash functions, collision-resistant hash functions, or chopping of elements of an underlying semantically-secure encryption scheme in calculating the consistency-check components. Even if such schemes use elements of algebraic groups, e.g. in secret keys and random components, the consistency checks are implemented in a way which moves the elements of the encryption scheme out of the algebraic groups. The loss of this underlying structure prevents proof of relationships between the input and output of the consistency check functions as explained earlier. In contrast, the above encryption scheme preserves structure by implementing the consistency check in a manner that does not leave the realm of algebraic groups. Specifically, the consistency check functionality in the above system uses a bilinear map between different algebraic groups in which a semantically-secure encryption scheme is embedded. The above construction can therefore be considered a structure-preserving CCA encryption scheme, where the term "structure-preserving" is used here in the sense that a certain structure is built into the whole ciphertext which is important for protocols requiring proof of certain properties of a ciphertext while at the same time preserving high levels of privacy.

While the construction has been illustrated for a message m that is a single group element, it will be apparent to those skilled in the art that the scheme extends in a straightforward manner to messages comprising a vector of group elements. Similarly, the scheme extends trivially to the case where a label L is a vector of group elements. Also, labels from the space $\{0, 1\}^*$ could be hashed to one or more group elements, so in general labels could be any bit strings which correspond to group elements.

Various modifications to the detailed encryption protocol can also be envisaged. For example, a variety of different encryption schemes may be employed to generate the encrypted message E from the plaintext message m. The consistency component V can also be generated in different ways. In the above formulation, for example, the consistency component comprises at least one element of the target group $G_T$. This is a particularly efficient formulation. In an alternative construction, however, the consistency component could comprise one or more pairs of elements from respective base groups $G_1$ and $G_2$. In this case, the bilinear map is used in the consistency component through use of pairs of group elements by which the bilinear map is satisfied, and this can be verified in the corresponding verification procedure. This type of implementation may offer greater flexibility for use in different scenarios. The details of such an implementation will be readily apparent to one skilled in the art.

Figure 3:
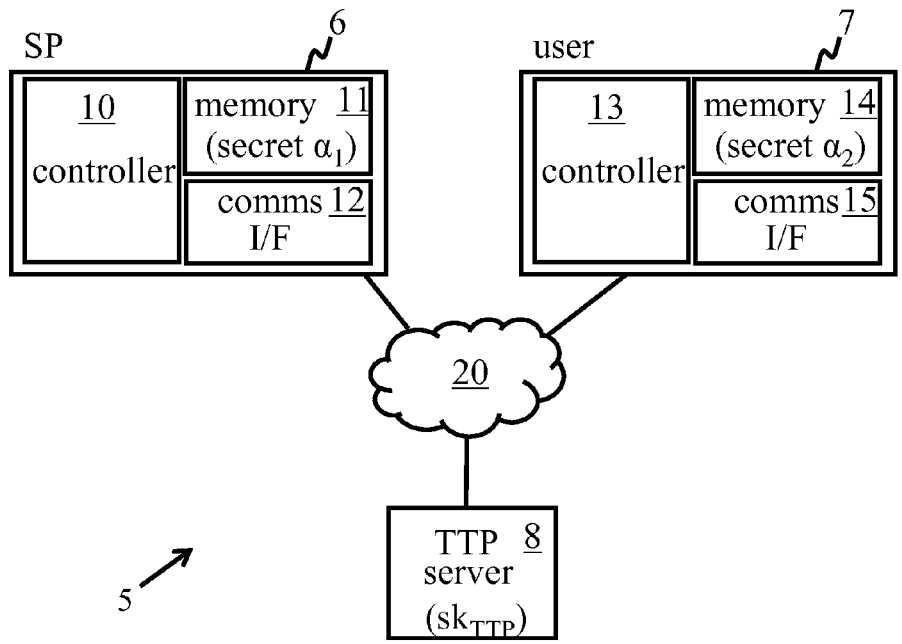
FIG. 3 is a schematic illustration of an exemplary data processing system implementing a joint ciphertext generation method embodying the invention.

The structure-preserving encryption scheme detailed above provides the basis for a joint ciphertext generation technique which will now be described with reference to FIGS. 3, 4a and 4b. FIG. 3 is a simplified schematic of an exemplary data processing system showing the main components involved in the operations to be described. The system 5 includes first and second devices, implemented by respective computers 6 and 7, which together perform the joint encryption scheme. For the purposes of this example we consider a system similar to FIG. 1 whereby the first computer 6 comprises a server operated by a service provider SP who offers a service to connecting users. The second computer 7 is implemented here by a user pc. System 5 includes a further computer implementing a server 8 corresponding to a trusted entity (TTP).

SP server 6 includes control logic in the form of controller 10 which controls operation of the server generally and implements key steps of the joint encryption process detailed below. The server 6 also includes memory 11 and a communications interface 12. Memory 11 stores various data used in the joint encryption process. This includes data (denoted by $\alpha_1$) which is secret to server 6 and is to be encrypted in the joint ciphertext, as well as various setup data for the encryption process detailed below. User pc 7 similarly includes control logic in the form of controller 13, as well as memory 14 and a communications interface 15. Controller 13 controls computer 7 generally and implements key steps of the joint encryption process with controller 10 of server 6. Memory 14 again stores data used in the encryption process, including data $\alpha_2$ which is secret to computer 7 and is to be encrypted in the joint ciphertext, as well as the setup data described below. In general, the control logic 10 and 13 of computers 6 and 7 may be implemented in hardware or software or a combination thereof, and the precise form of the computers 6, 7 is largely irrelevant to fundamental operation of the joint encryption scheme to be described. In this particular example, the control logic 10, 13 is implemented by respective computer programs which configure the host computers to perform the functions described. Suitable software will be apparent to those skilled in the art from the description herein.

In operation of system 5, computers 6, 7 and 8 can communicate over a data communications network 20 via their respective communications interfaces. Network 20 could in general comprise one or more component networks and/or internetworks and is implemented by the Internet in this scenario. In particular, we consider a scenario analogous to that of FIG. 1 whereby the user computer 7 requests access to an internet-based service provided by SP server 6. The SP server 6 will permit anonymous access to the service but requires payment in return. To provide the required user-privacy coupled with accountability to the service provider, the computers 6, 7 engage in a joint encryption process before access to the service is granted. In this process, the parties jointly generate a ciphertext which encrypts both secret data $\alpha_1$ of the service provider and secret data $\alpha_2$ of the user. The user's secret data $\alpha_2$ includes at least user ID data identifying the user, but may also include other data such context data for the transaction in question. The SP secret data $\alpha_1$ includes context data identifying the transaction. This context data includes such data as can later be used, if required, to confirm non-payment for the transaction to the TTP. Such context data may indicate, for instance, SP identity, date, time, transaction type, etc.

Figure 4A:
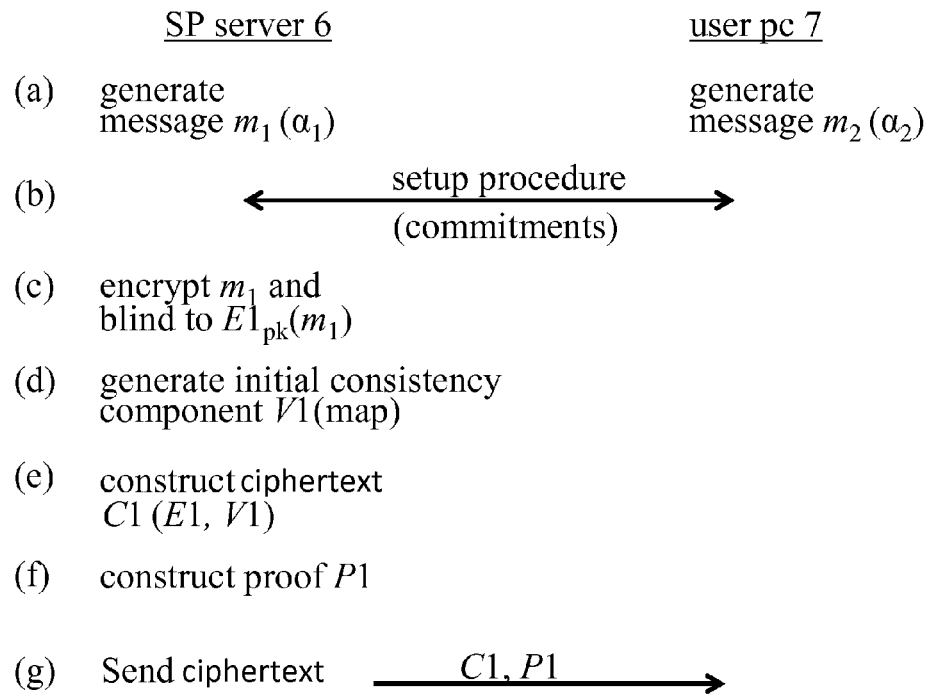
FIGS. 4a and 4b illustrate key steps performed by system devices in performance of the joint ciphertext generation method.

The key steps in an initial stage of the joint encryption process are indicated in FIG. 4a. Steps performed by SP server 6 are shown on the left of this figure and steps performed by user pc 7 are shown on the right. In a first step, step (a) of the process, both parties generate messages encoding their respective secret data. Controller 10 of SP server 6 constructs a message $m_1$ representing the secret data $\alpha_1$. Controller 13 of user pc 7 similarly constructs a message $m_2$ representing the secret data $\alpha_2$. Each of these messages $m_1$, $m_2$ comprises one or more elements of a pair of algebraic groups as discussed further below. The messages $m_1$, $m_2$ are stored in respective device memories 11, 14. In step (b) of the process, controllers 10, 13 communicate via network 20 and communications interfaces 12, 15 to implement a setup procedure. This procedure involves agreement to certain parameters to be used in the joint encryption scheme and exchange of cryptographic commitments as detailed below.

Following setup, controller 10 of SP server 6 performs a first stage of the encryption scheme comprising steps (c) to (g) in FIG. 4a. In step (c), controller 10 encrypts the message $m_1$ using the public key $pk_{TTP}$ of TTP server 8. The resulting encryption is also blinded by controller 10 to produce an initial blinded encrypted message denoted by E1 in the figure. The encryption process in step (c) is described in more detail below. In step (d), controller 10 then generates an initial consistency component V1 using a bilinear map which is associated with the algebraic groups from which the message $m_1$ is constructed. This process is detailed below. The initial consistency component V1 constitutes a check component for validating the ciphertext to be output by controller 10. In particular, as represented in step (e) of the figure, controller 10 constructs an initial ciphertext C1, which includes both the initial blinded encrypted message E1 and the consistency component V1. Next, in step (f), controller 10 generates a proof P1 indicative of correct computation of the ciphertext C1. This is explained further below. In step (g), controller 10 sends the initial ciphertext C1, and associated proof P1, to user pc 7 via communications interface 12 and network 20.

Figure 4B:
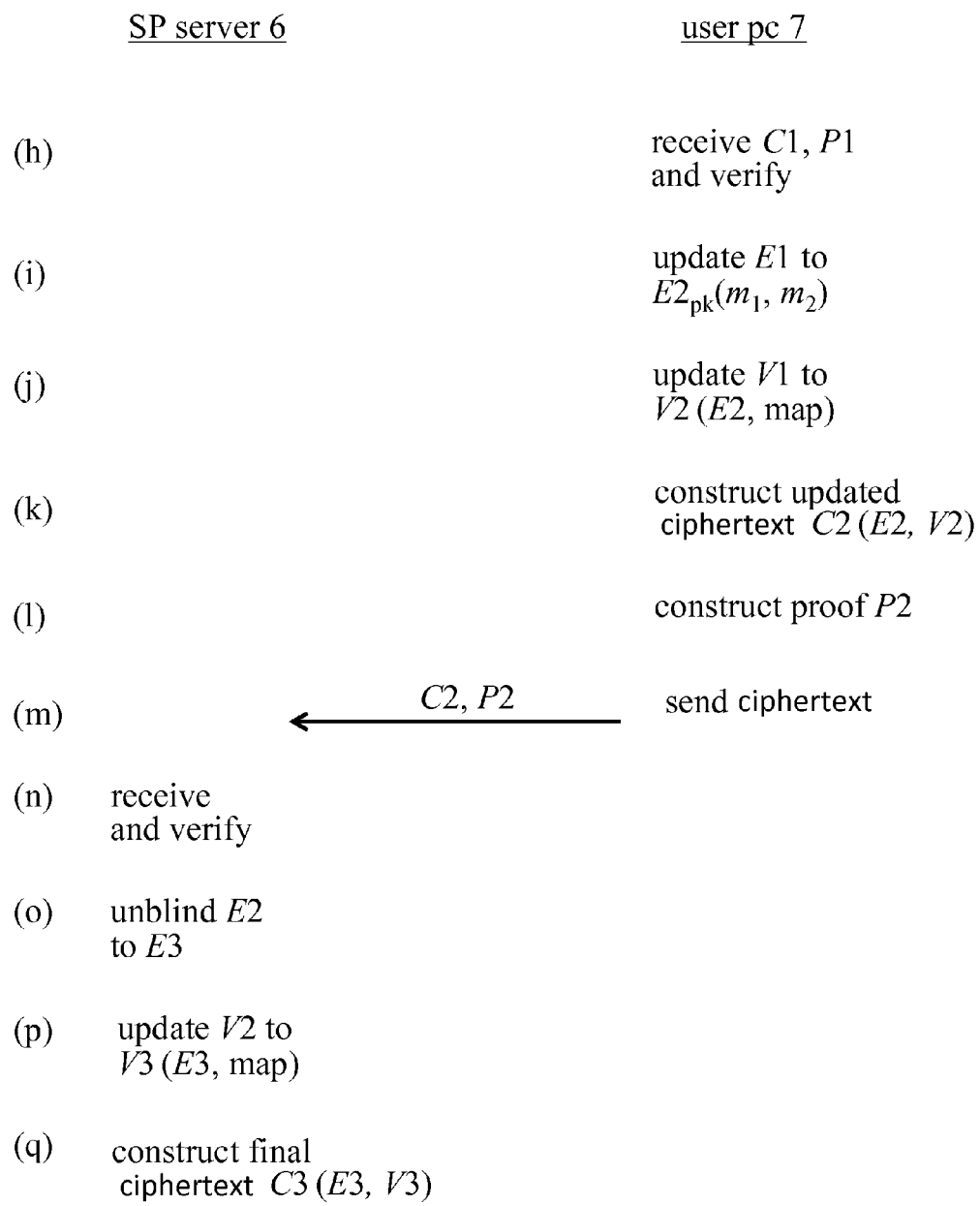

The remaining steps of the joint encryption process are indicated in FIG. 4b. The second stage of this process is performed by controller 13 of user pc 7 and spans steps (h) to (m) in the figure. In step (h), controller 13 receives the initial ciphertext C1 and verifies the proof P1 to confirm that the ciphertext has been correctly computed by SP server 6 and has not been tampered with in transit. In step (i), controller 13 then generates an updated blinded encrypted message, denoted by E2, by updating the initial blinded encrypted message E1 in ciphertext C1. In particular, as detailed below, the initial message E1 is updated to include an encryption of the second message $m_2$ under the public key $pk_{TTP}$ of TTP server 8. The resulting encrypted message E2 thus includes an encryption of both parties' messages $m_1$ and $m_2$. Next, in step (j) controller 13 generates an updated consistency component V2 using the initial consistency component V1 and the aforementioned bilinear map. This process effectively updates the consistency component such that the updated consistency component V2 constitutes a check component for validating the ciphertext to be output by controller 13. In particular, as represented in step (k) of the figure, controller 13 constructs an updated ciphertext C2, which includes both the updated blinded encrypted message E2 and the updated consistency component V2. Next, in step (l), controller 13 generates a proof P2 indicative of correct computation of the updated ciphertext C2. In step (m) controller 13 sends the updated ciphertext C2, and associated proof P2, to SP server 6 via network 20.

The final stage of the joint encryption process, indicated by steps (n) to (q) in FIG. 4b, is performed by controller 10 of SP server 6. In step (n), controller 10 receives the updated ciphertext C2 and verifies the proof P2 to confirm that the ciphertext has been correctly computed by pc 7 and has not been modified in transit. Next, in step (o) controller 10 generates a final encrypted message E3 by unblinding the updated blinded encrypted message E2. This is explained further below. Next, in step (p) controller 10 generates a final consistency component V3 using the updated consistency component V2 and the bilinear map. This process updates the consistency component to validate the final ciphertext. In particular, as represented in step (q) of the figure, the final ciphertext C3 is constructed using the final encrypted message E3 and the final consistency component V3.

Another exemplary implementation of the above encryption scheme, including details of the underlying cryptographic processes, is described in the following. This implementation is based on the structure-preserving encryption scheme detailed earlier, whereby each message $m_1$ and $m_2$ contains at least one element of a pair of base groups $G_1$, $G_2$ satisfying a bilinear map ê: $G_1 \times G_2 \rightarrow G_T$ where $G_T$ is a target group. Once again, we assume for simplicity here that $G_1$ and $G_2$ are identical groups denoted by G. The implementation provides for joint encryption of a function of the two secrets $\alpha_1$ and $\alpha_2$ where for simplicity we consider the function $y^{\alpha_1+\alpha_2}$ where y is a fixed group element in G. In general, however, the function could be any polynomial of the two secrets.

Let G and $G_T$ be groups of prime order q equipped with a non-degenerate, efficiently computable bilinear map ê: $G \times G \rightarrow G_T$. Recalling the ciphertext structure in the structure-preserving encryption scheme above, for a public key pk=(G, $g,g_1,g_2,g_3,h_1,h_2,\{f_{i,1},f_{i,2}\}_{i=0}^5$) and randomly chosen r, s $\leftarrow Z_q$ the ciphertext can be represented as:

$$(u_1,u_2,u_3,u_4,v)=(g_1^r,g_2^s,g_3^{r+s},m \cdot h_1^r h_2^s, \Pi_{i=0}^4 \hat{e}(f_{i,1}^r f_{i,2}^s, u_i)) \quad (1)$$

where $u_0=g$. In this representation, $u_4$ corresponds to the encrypted message and v is the consistency component for the ciphertext.

The process of FIGS. 4a and 4b produces a final ciphertext C3 consistent with this structure-preserving scheme as follows. In step (a) of FIG. 4a, the messages $m_1$ and $m_2$ are constructed as:

$$m_1 = y^{\alpha_1} \text{ and } m_2 = y^{\alpha_2}$$

In the setup procedure of step (b), the controllers 10, 13 agree on a randomly chosen value z and select respective random values $w_1$ and $w_2$. Controller 10 generates a commitment $y^{\alpha_1} z^{w_1}$ to secret data $\alpha_1$ and sends the commitment to controller 13. Similarly, controller 13 generates a commitment $y^{\alpha_2} z^{w_2}$ to secret data $\alpha_2$ and sends this commitment to controller 10. Both parties know the public key pk of TTP 8 as above.

Controller 10 generates the initial ciphertext C1 as follows. Using randomly chosen values $t_1$ to $t_6$, $r_1$ and $s_1$, an initial blinded random component, consisting of three elements $\bar{u}_1'$, $\bar{u}_2'$, and $\bar{u}_3'$ is generated as:

$$\bar{u}_1' = g^{t_1} \cdot g_1^{r_1}$$

$$\bar{u}_2' = g^{t_2} \cdot g_2^{s_1}$$

$$\bar{u}_3' = g^{t_3} \cdot g_3^{r_1+s_1}$$

The elements $g^{t_1}$, $g^{t_2}$ and $g^{t_3}$ here serve to randomize the basic elements and thus implement the blinding operation. The initial blinded encrypted message E1 is produced in step (c) as $E1=\bar{u}_4'$ where:

$$\bar{u}_4' = g^{t_4} \cdot y^{\alpha_1} \cdot h_1^{r_1} h_2^{s_1},$$

the element $g^{t_4}$ implementing the blinding here. The verification component V1 is then generated as $V1=(\bar{v}_1',\bar{v}_2')$ where the sub-components $\bar{v}_1',\bar{v}_2'$ are given by:

$$\bar{v}_1' = \prod_{i=1} \hat{e}(f_{i,1}, g^{t_i}) \cdot \hat{e}(g_1, g^{t_5})$$

$$\bar{v}_2' = \prod_{i=1} \hat{e}(f_{i,2}, g^{t_i}) \cdot \hat{e}(g_2, g^{t_6})$$

The initial ciphertext C1 is $(\bar{u}_1',\bar{u}_2',\bar{u}_3',\bar{u}_4',\bar{v}_1',\bar{v}_2')$. The proof of correct computation P1 for this ciphertext comprises a proof of knowledge of appropriate values $w_1, t_1$ to $t_6, \alpha_1, r_1$ and $s_1$ such that the computed values in C1 hold, i.e. that the components are correctly calculated and the verification component V1 validates (is consistent with) these components according to the formula for generating the verification component from the other ciphertext components. Such proofs can be made in generally known manner, using standard cryptographic techniques, and need not be described in detail here. Suitable implementations will be readily apparent to those skilled in the art. For example, the proof P1 can be made by exploiting the Groth Sahai proof system described in "Efficient Non-interactive Proof Systems for Bilinear Groups", Jens Groth, Amit Sahai, EUROCRYPT 2008: 415-432. Alternatively, for example, the proof might be made using normal discrete logarithm based proofs as described, for instance, in "On the Portability of Generalized Schnorr Proofs", Camenisch, et al., Eurocrypt 2009, LNCS 5479, pp. 425-442, 2009. Such proofs can be made in "zero-knowledge" whereby the proof does not reveal to the verifier anything other than that which is to be proved.

In the second stage of the joint encryption scheme (steps (h) to (m) in FIG. 4b), the controller 13 generates the updated ciphertext C2 as follows. Using randomly chosen values $r_2$ and $s_2$, an updated blinded random component, consisting of three elements $\bar{u}_1$, $\bar{u}_2$ and $\bar{u}_3$, is generated by further randomizing the initial random component as:

$$\bar{u}_1 = u_1' \cdot g_1^{r_2}$$

$$\bar{u}_2 = u_2' \cdot g_2^{z_2}$$

$$\bar{u}_3 = u_3' \cdot g_3^{r_2+s_2}$$

The updated blinded encrypted message E2 is produced in step (i) as $E2 = \bar{u}_4$ where:

$$\bar{u}_4 = u_4' \cdot y^{\alpha_2} \cdot h_1^{r_2} h_2^{s_2}.$$

The updated verification component V2 is then generated as $V2 = \bar{v}$ where:

$$\bar{v} = \left( \prod_{i=0} \frac{\hat{e}(f_{i,1}, \bar{u}_i)}{v_1'} \right)^{r_2} \left( \prod_{i=0} \frac{\hat{e}(f_{i,2}, \bar{u}_i)}{v_2'} \right)^{s_2}$$

where $\bar{u}_0 = g$.

The updated ciphertext C2 is $(\bar{u}_1, \bar{u}_2, \bar{u}_3, \bar{u}_4, \bar{v})$. The proof of correct computation P2 for this ciphertext comprises a proof of knowledge of appropriate values $w_2$, $\alpha_2$, $r_2$ and $s_2$ such the computed values hold and the verification component V2 validates the ciphertext. Again this proof can be made in generally known manner and need not be described in detail here.

In the final stage of the joint encryption scheme (steps (n) to (q) in FIG. 4b), the controller 10 generates the final ciphertext C3 as follows. A final random component, consisting of three elements $u_1$, $u_2$ and $u_3$ is obtained by unblinding the updated blinded random component:

$$u_1 = \frac{\bar{u}_1}{g^{t_1}} = g_1^r$$

$$u_2 = \frac{\bar{u}_2}{g^{t_2}} = g_2^s$$

$$u_3 = \frac{\bar{u}_3}{g^{t_3}} = g_3^{r+s}$$

The final encrypted message E3 is produced by unblinding the updated blinded encrypted message to obtain $E3 = u_4$ where:

$$u_4 = \frac{\bar{u}_4}{g^{t_4}} = y^{\alpha_1 + \alpha_2} \cdot h_1^r h_2^s$$

The final verification component V3 is then generated as $V3 = v$ where:

$$v = \bar{v} \hat{e}(u_1 g_1^{r_1}, g^{t_5}) \hat{e}(u_2 g_2^{s_1}, g^{t_6}) \prod_{i=0} \hat{e}(f_{i,1}^{r_1} f_{i,2}^{s_1}, u_i)$$

where $u_0 = g$.

Note that the above protocol computes a valid ciphertext of the basic structure-preserving encryption scheme given in Equation (1) above because $u_1 = g_1^r$ for $r = r_1 + r_2$, $u_2 = g_2^s$ for $s = s_1 + s_2$, $u_3 = g_3^{r+s}$, $u_4 = m \cdot h_1^r h_2^s$ for $m = y^{\alpha_1 + \alpha_2}$ and $v = \Pi_{i=0} \hat{e}(f_{i,1}^r f_{i,2}^s, u_i)$.

To see that v is indeed computed this way, note that:

$$\bar{v} = \left( \prod_{i=0} \frac{\hat{e}(f_{i,1}, \bar{u}_i)}{v_1'} \right)^{r_2} \left( \prod_{i=0} \frac{\hat{e}(f_{i,2}, \bar{u}_i)}{v_2'} \right)^{s_2} = \frac{\prod_{i=0} \hat{e}(f_{i,1}^{r_1} f_{i,2}^{s_1}, u_i)}{\hat{e}(g_1, g^{t_5})^{r_2} \hat{e}(g_2, g^{t_6})^{s_2}}$$

and $$\bar{v} \hat{e}\left( \frac{u_1}{g_1^{r_1}}, g^{t_5} \right) \hat{e}\left( \frac{u_2}{g_2^{s_1}}, g^{t_6} \right) = \bar{v} \hat{e}(g_1^{r_2}, g^{t_5}) \hat{e}(g_2^{s_2}, g^{t_6}) = \prod_{i=0} \hat{e}(f_{i,1}^{r_2} f_{i,2}^{s_2}, u_i).$$

It will be seen from the detailed protocol above that the encrypted messages E1, E2 and E3, and the various random components, each comprise a set of (one or more) elements from the pair of base groups (here the same group G). The updated consistency component V2 is generated by applying the bilinear map to the updated encrypted message E2, and the final consistency component V3 is generated by applying the bilinear map to the final encrypted message E3. Generation of all consistency components includes applying the bilinear map to the corresponding random component. The resulting consistency components here comprise elements of the target group $G_T$.

The final ciphertext C3 generated by the above process constitutes a joint encryption of the two parties' messages $m_1$ and $m_2$, and in particular of the agreed function $y^{\alpha_1 + \alpha_2}$ of the two party's secrets, under jointly-chosen randomness. This joint ciphertext is produced in such a way that neither party sees the other party's secret $\alpha_1$, $\alpha_2$. Moreover, only the SP server 6 sees the final joint ciphertext. The joint ciphertext is not seen by user computer 7 which can nonetheless be assured of correct computation through its own involvement in the joint procedure. In the event that the user does not pay his bill, SP server can send the joint ciphertext to TTP server 8 with appropriate proof of non-payment for the transaction. TTP server 8 can decrypt the ciphertext C3 using the secret TTP key $sk_{TTP}$ corresponding to the public key $pk_{TTP}$ used in the encryption scheme. The decrypted joint message $y^{\alpha_1 + \alpha_2}$ is then returned to SP server 6 where controller 10 can extract the user's secret data $\alpha_2$. This contains the user ID whereby the service provider can take action to obtain payment.

It can be seen that the joint encryption scheme offers significant security benefits compared to the prior scenario of FIG. 1. The verifier (SP server 6 in FIG. 3) is better protected because the user pc 7 (unlike user pc 1 in FIG. 1) does not see the context data that the verifier contributes to the encryption. This is the data that the verifier would later use to identify a transaction to the TTP when requesting decryption. Hence, with the joint encryption scheme, the user cannot try to influence the TTP to prevent decryption and prejudice the verifier. Moreover, the TTP sees only the joint message of the parties, and not the individual message of either party. The TTP cannot therefore favor either party over the other, and indeed cannot discriminate against any specific party in any of its operations. Both parties are therefore better protected against corruption of the TTP. Overall, therefore, the joint ciphertext generation process provides a highly efficient joint encryption scheme which is both CCA secure and offers improved security to the encrypting parties.

While an exemplary embodiment has been described above, many alternatives and modifications can be envisaged. For example, the various possible modifications described earlier for the basic structure-preserving encryption scheme can all be accommodated in the joint encryption process, and suitable modifications to the protocol will be apparent to those skilled in the art. In addition, while the use of labels has been omitted from the joint encryption protocol for simplicity, it will be appreciated that labels can be readily accommodated as in the basic encryption scheme described above. Various other modifications to detailed encryption protocol can be envisaged. For example, in the highly efficient construction above, the final ciphertext includes the final encrypted message in the form obtained directly after the unblinding operation. In general, however, this final encrypted message could be further processed and incorporated in the resulting processed form in the final ciphertext.

While a simple data processing system 5 is used for illustrative purposes above, encryption schemes embodying the invention may be implemented in various systems involving processing devices other than general-purpose computers, e.g. mobile phones, PDAs (personal digital assistants), smart cards, card-readers, etc. In addition, the TTP may be implemented by a plurality of devices and/or persons of a distributed trusted entity.

Joint encryption schemes embodying the invention can of course be employed in numerous other application scenarios. In some scenarios it may be appropriate for the joint encryption process to be performed twice, with a different party initiating the protocol in each case. Each party then obtains a joint ciphertext encrypting the parties' secrets, though these ciphertexts will of course differ due to the different random values selected in the two processes. A particular example here may be a contract scenario whereby each party obtains a joint signature on the contract in question.

One aspect of the present invention provides a method for joint generation of a ciphertext by devices of a data processing system. The method includes, at a first device: providing a first message, representing secret data of the first device, comprising at least one element of a pair of base groups $G_1$, $G_2$ satisfying a bilinear map $\hat{e}$: $G_1 \times G_2 \rightarrow G_T$ where $G_T$ is a target group; generating an initial ciphertext comprising an initial blinded encrypted message, in which the first message is encrypted under a public key of a trusted entity, and an initial consistency component for validating the initial ciphertext, wherein the initial consistency component is generated using the bilinear map; and sending the initial ciphertext to a second device; at the second device: receiving the initial ciphertext; providing a second message, representing secret data of the second device, comprising at least one element of the pair of base groups; generating an updated ciphertext comprising an updated blinded encrypted message and an updated consistency component for validating the updated ciphertext, wherein the updated blinded encrypted message is generated using the initial blinded encrypted message and an encryption of the second message under the public key, and wherein the updated consistency component is generated using the initial consistency component and the bilinear map; and sending the updated ciphertext to the first device; and at the first device: receiving the updated ciphertext; unblinding the updated blinded encrypted message to obtain a final encrypted message; and generating a final ciphertext comprising the final encrypted message and a final consistency component for validating the final ciphertext, wherein the final consistency component is generated using the updated consistency component and the bilinear map.

Methods embodying this invention permit two parties, corresponding to first and second devices in a data processing system, jointly to generate a ciphertext encrypting their respective secret data under the public key of a trusted entity. As a basis for the scheme, each party's secret data is represented by a message which comprises one or more elements of a pair of base groups satisfying a bilinear map to a target group. The first party generates an initial encrypted message in which the first message is encrypted under the trusted entity's public key. This initial encrypted message is also blinded. (The concept of blinding is well known in cryptographic applications and need not be described in detail here. It suffices to understand that the blinding process essentially "hides" the item in question by applying a cryptographic function, typically involving some randomly chosen secret value(s), such that the item can later be extracted, or "unblinded", by applying the inverse function). The first party outputs an initial ciphertext comprising the initial blinded encrypted message and also an initial consistency component for validating the ciphertext. This consistency component is generated using the aforementioned bilinear map. The initial ciphertext is sent to the second party who can simply update the encrypted message to accommodate the second message representing that party's secret data. The second party also updates the consistency component accordingly, again using the bilinear map. The resulting updated ciphertext is then returned to the first party who can simply unblind the updated encrypted message to obtain a final encrypted message, and then finalize the consistency component appropriately for the final ciphertext. The final encrypted message is thus a joint encryption of the first and second messages, and the final consistency component correctly validates the final, jointly-generated ciphertext.

By basing the encryption scheme on groups satisfying a bilinear map and using the bilinear map in the consistency elements as described, the final joint ciphertext can be generated in an incremental manner such that neither party learns each other's secret data while at the same time providing CCA security in the joint encryption scheme. In addition, only the first party to the scheme sees the final, jointly-generated ciphertext. The final ciphertext can therefore remain secret from the second party who may nonetheless be assured, via his own input to the process, that the final ciphertext is correctly computed. Methods embodying the invention can be implemented in an efficient manner, and provide joint encryption schemes which are both CCA-secure and offer improved security to the encrypting parties. The various security advantages of joint encryption schemes embodying the invention will be described in more detail below.

In general, the first and second devices implementing the joint encryption scheme may comprise any apparatus or component of a data processing system adapted to perform the functions described. The secret data associated with each device may comprise any data which is to be protected from unauthorised access, and the precise nature of this data will largely depend on the particular application scenario. The trusted entity whose public key is utilized in the scheme might be any device, person or combination of one or more devices and/or persons constituting a party who is trusted (to at least some extent) for the purposes of implementing the scheme.

The various consistency components generated in the joint encryption scheme permit validation of the corresponding ciphertexts. While validity might be confirmed in various ways, in the exemplary implementations below the first device generates a proof indicative of correct computation of the initial ciphertext and provides this proof to the second device with the initial ciphertext. Similarly, the second device generates a proof indicative of correct computation of the updated ciphertext and provides this proof to the first device with the updated ciphertext. These proofs demonstrate knowledge of appropriate values such that the corresponding ciphertext has been computed correctly and is therefore valid, i.e. that the consistency component is correct for (consistent with) that ciphertext. In general, such a proof may be provided via an interactive process between the devices in question or could simply be sent with the associated ciphertext to the receiving device.

In some embodiments, the step of providing a message representing secret data of a device implementing the scheme may involve an encoding step whereby input user data is encoded to obtain a message containing one or more group elements representing that user data. In other embodiments, the message representing the secret data may simply be provided in the device, e.g. stored in device memory, for use in the encryption process. In any case, the message may in general comprise one or more elements of the base groups $G_1$, $G_2$, where $G_1$ may or may not be equal to $G_2$.

The first and second messages can be encrypted in any convenient manner using the public key of the trusted entity. In the exemplary embodiments detailed below, each of the initial, updated and final encrypted messages comprises at least one element of the pair of base groups. The updated consistency component is then generated by applying the bilinear map to the updated encrypted message, and the final consistency component is generated by applying the bilinear map to the final encrypted message. An individual consistency component may comprise a number of sub-components collectively constituting that consistency component, and other items and processes may additionally be used in generating the various consistency components. For example, in exemplary methods detailed below the various ciphertexts each include a random component which is used in generating the consistency component in the ciphertext. Such a random component may comprise at least one element of the pair of base groups $G_1$, $G_2$, and generation of the consistency component may include applying the bilinear map to the random component.

A second aspect of the invention provides a first device for joint generation of a ciphertext with a second device in a data processing system. The first device comprises memory for storing a first message, representing secret data of the first device, comprising at least one element of a pair of base groups $G_1$, $G_2$ satisfying a bilinear map $\hat{e}: G_1 \times G_2 \rightarrow G_T$ where $G_T$ is a target group, a communications interface for communicating with the second device, and control logic adapted to: generate an initial ciphertext comprising an initial blinded encrypted message, in which the first message is encrypted under a public key of a trusted entity, and an initial consistency component for validating the initial ciphertext, the initial consistency component being generated using the bilinear map; send the initial ciphertext via the communications interface to the second device; on receipt from the second device of an updated ciphertext comprising an updated blinded encrypted message and an updated consistency component for validating the updated ciphertext wherein the updated blinded encrypted message comprises the initial blinded encrypted message and an encryption under the public key of a second message, representing secret data of the second device and comprising at least one element of the pair of base groups, to unblind the updated blinded encrypted message to obtain a final encrypted message; and to generate a final ciphertext comprising the final encrypted message and a final consistency component for validating the final ciphertext, the final consistency component being generated using the updated consistency component and the bilinear map.

A third aspect of the invention provides a second device for joint generation of a ciphertext with a first device in a data processing system. The second device comprises memory for storing a second message, representing secret data of the second device, comprising at least one element of a pair of base groups $G_1$, $G_2$ satisfying a bilinear map $\hat{e}: G_1 \times G_2 \rightarrow G_T$ where $G_T$ is a target group, a communications interface for communicating with the first device, and control logic adapted, on receipt from the first device of an initial ciphertext comprising an initial blinded encrypted message and an initial consistency component for validating the initial ciphertext, to: generate an updated ciphertext comprising an updated blinded encrypted message and an updated consistency component for validating the updated ciphertext, the updated blinded encrypted message being generated using the initial blinded encrypted message and an encryption of the second message under a public key of a trusted entity, and the updated consistency component being generated using the initial consistency component and the bilinear map; and send the updated ciphertext to the first device.

A fourth aspect of the invention provides a computer program comprising program code means for causing a computer to implement a device according to the second or third aspects of the invention. It will be understood that the term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

Many other changes and modifications can be made to the embodiments described without departing from the scope of the invention.

The invention claimed is:

1. A system, comprising:
a first device configured for joint generation of a ciphertext with a second device in a data processing system, the first device comprising memory for storing a first message, representing secret data of the first device, comprising at least one element of a pair of base groups $G_1$, $G_2$ satisfying a bilinear map $\hat{e}: G_1 \times G_2 \rightarrow G_T$ where $G_T$ is a target group, a communications interface for communicating with the second device, and control logic adapted to:
generate an initial ciphertext comprising an initial blinded encrypted message, in which the first message is encrypted under a public key of a trusted entity, and an initial consistency component for validating the initial ciphertext, the initial consistency component being generated using the bilinear map;

send the initial ciphertext via the communications interface to the second device;

on receipt from the second device of an updated ciphertext comprising an updated blinded encrypted message and an updated consistency component for validating the updated ciphertext, the updated consistency component being generated using the initial consistency component and the bilinear map, wherein the updated blinded encrypted message comprises the initial blinded encrypted message and an encryption under the public key of a second message, representing secret data of the second device and comprising at least one element of the pair of base groups, to unblind the updated blinded encrypted message to obtain a final encrypted message; and to generate a final ciphertext comprising the final encrypted message and a final consistency component for validating the final ciphertext, the final consistency component being generated using the updated consistency component and the bilinear map.

2. The system of claim 1, wherein the control logic is further adapted to generate a proof indicative of correct computation of the initial ciphertext and to provide the proof to the second device.

3. The system of claim 1, wherein each of the initial, updated and final encrypted messages comprises at least one element of the pair of base groups.

4. The system of claim 1, wherein the control logic is further adapted to:

generate a blinded random component;

generate the initial consistency component using the blinded random component;

include the blinded random component in the initial ciphertext;

receive from the second device an updated blinded random component included in the updated ciphertext;

unblind the updated blinded random component to obtain a final random component;

generate the final consistency component using the final random component; and include the final random component in the final ciphertext.

5. A non-transitory computer readable storage medium containing computer readable instructions stored thereon that, when executed by a computer, implement the system of claim 1.

* * * * *